(12) United States Patent
Lerner

(10) Patent No.: US 10,212,356 B1
(45) Date of Patent: Feb. 19, 2019

(54) PARALLEL HIGH DYNAMIC EXPOSURE RANGE SENSOR

(71) Applicant: Snap Inc., Santa Monica, CA (US)

(72) Inventor: Scott Lerner, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/610,314

(22) Filed: May 31, 2017

(51) Int. Cl.
  *H04N 5/235* (2006.01)
  *H04N 5/225* (2006.01)
  *H04N 5/04* (2006.01)
  *G02B 3/00* (2006.01)

(52) U.S. Cl.
  CPC ......... *H04N 5/2352* (2013.01); *G02B 3/0037* (2013.01); *H04N 5/04* (2013.01); *H04N 5/2258* (2013.01); *H04N 5/2351* (2013.01)

(58) Field of Classification Search
  CPC .... H04N 5/2355; H04N 5/2356; H04N 5/238; H04N 5/3535; H04N 5/355; H04N 5/35536; H04N 5/35545; H04N 5/35554; H04N 5/35563; H04N 5/35572; H04N 5/35581
  USPC .............................. 348/221.1, 362
  See application file for complete search history.

(56) References Cited

U.S. PATENT DOCUMENTS

| | | | |
|---|---|---|---|
| 5,801,773 A * | 9/1998 | Ikeda | H04N 5/20 348/229.1 |
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,345,144 B1 * | 1/2013 | Georgiev | G03B 11/00 348/335 |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Roote et al. | |
| 8,995,433 B2 | 3/2015 | Rojas | |

(Continued)

FOREIGN PATENT DOCUMENTS

CA       2887596      7/2015

OTHER PUBLICATIONS

Leyden, John, "This SMS will self-destruct in 40 seconds", [Online]. Retrieved from the Internet: URL: http://www.theregister.co.uk/2005/12/12/stealthtext/, (Dec. 12, 2005), 1 pg.

*Primary Examiner* — Anthony J Daniels
(74) *Attorney, Agent, or Firm* — Schwegman Lundberg & Woessner, P.A.

(57) ABSTRACT

Systems, apparatuses, and methods are presented for taking a combination of images taken synchronous in time with one another. According to one example, the present disclosure proposes one or more sensor arrays, each of which comprises multiple pixel sensors arranged to capture image data responsive to light exposure. Light is incident on the respective sensor arrays during substantially synchronous exposures. The one or more sensor arrays are configured such that the image data captured by the respective sensor arrays during the synchronous exposure differ in at least one of a luminance output or a color profile from one another.

10 Claims, 10 Drawing Sheets

(56) References Cited

U.S. PATENT DOCUMENTS

| | | |
|---|---|---|
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 2011/0202598 A1 | 8/2011 | Evans et al. |
| 2012/0209924 A1 | 8/2012 | Evans et al. |
| 2014/0340553 A1* | 11/2014 | Kuang ............... H04N 5/2355 348/302 |
| 2015/0256734 A1* | 9/2015 | Fukuhara ........... H04N 5/2355 348/294 |
| 2017/0094205 A1* | 3/2017 | Jannard ............. H04N 5/35581 |
| 2017/0163902 A1* | 6/2017 | Wu .................... H04N 5/2355 |
| 2018/0013945 A1* | 1/2018 | Ciurea .............. H04N 5/35563 |
| 2018/0024330 A1* | 1/2018 | Laroia ................ H04N 5/2258 |

* cited by examiner

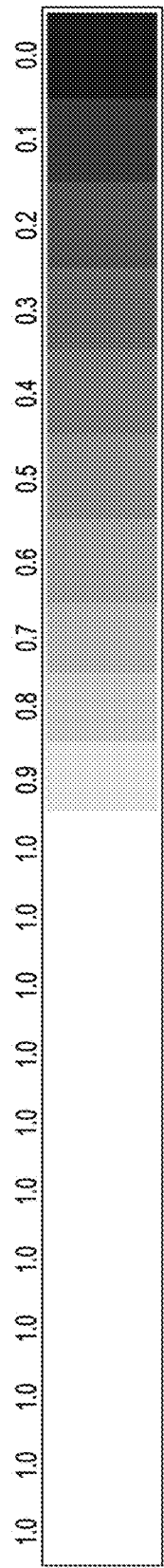
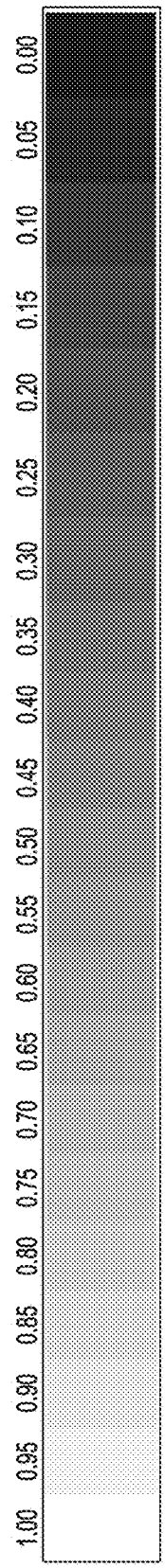
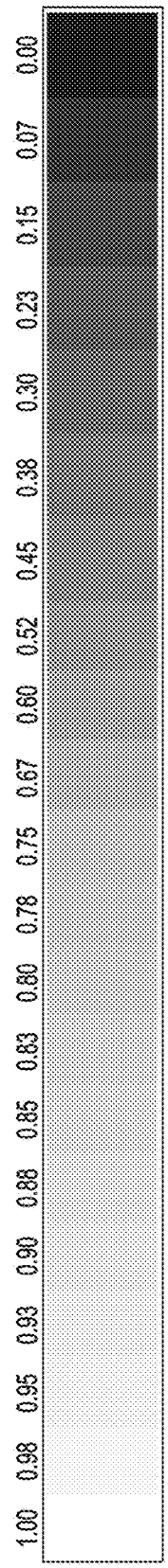
FIG. 6A
FIG. 6B
FIG. 6C

PARALLEL HIGH DYNAMIC EXPOSURE RANGE SENSOR

TECHNICAL FIELD

Embodiments of the present disclosure relate generally to an image sensor. More particularly, but not by way of limitation, the present disclosure provides systems, methods and techniques for increasing dynamic exposure range of the image sensor.

BACKGROUND

A digital image sensor utilizes an array of light sensitive cells called pixels. The brighter the light that is incident to a pixel, the greater the charge that accumulates on the pixel. This charge results in a voltage on the pixel that can be sampled and quantized. The brightness of the resulting image is related to the voltage sampled on the pixel. An electronic shutter clears the charge from all the pixels in the array. The exposure time of the image sensor is the time from the clearing of the array to the sampling of it.

Typically, an image sensor uses the same exposure for all pixels in the array. Furthermore, the image sensor typically uses a linear range of pixel devices such that the voltage response of the devices is proportional to the amount of light incident on the devices throughout the dynamic exposure range of the pixel devices.

Every digital image sensor has a dynamic exposure range that is more limited than that of the human eye. Thus, in a high contrast scene, the image captured by the sensor may have the brighter details overexposed or washed out because incident light caused the pixels to exceed the upper end of their dynamic exposure range. Additionally, the image may have the darker details underexposed because the light incident to the pixel did not reach the lower end of their dynamic exposure range. Thus, one may be forced to choose to capture either the detail in dark areas of the scene and leave the light areas over-exposed, or to choose to capture the detail in the light areas of the scene and leave the dark areas under-exposed.

In response to this quandary, one solution has been to develop digital image sensors having "high dynamic exposure range" (HDR), which increases dynamic exposure range by combining two or more images taken at different exposure during a time sequence. However, HDR can be difficult to process, for example, in cases where an HDR video is desired. The present application proposes different solutions to increase the dynamic exposure range.

BRIEF DESCRIPTION OF THE DRAWINGS

Various ones of the appended drawings merely illustrate example embodiments of the present disclosure and should not be considered as limiting its scope.

FIGS. 6A to 6C show the response of the image sensor shown in the graph of FIG. 4 according to the dynamic exposure range test chart of FIG. 5, the response including full exposure pixels (FIG. 6A), half exposure pixels (FIG. 6B) and a composite of the full exposure pixels and half exposure pixels (FIG. 6C), according to some example embodiments.

Figure 1:
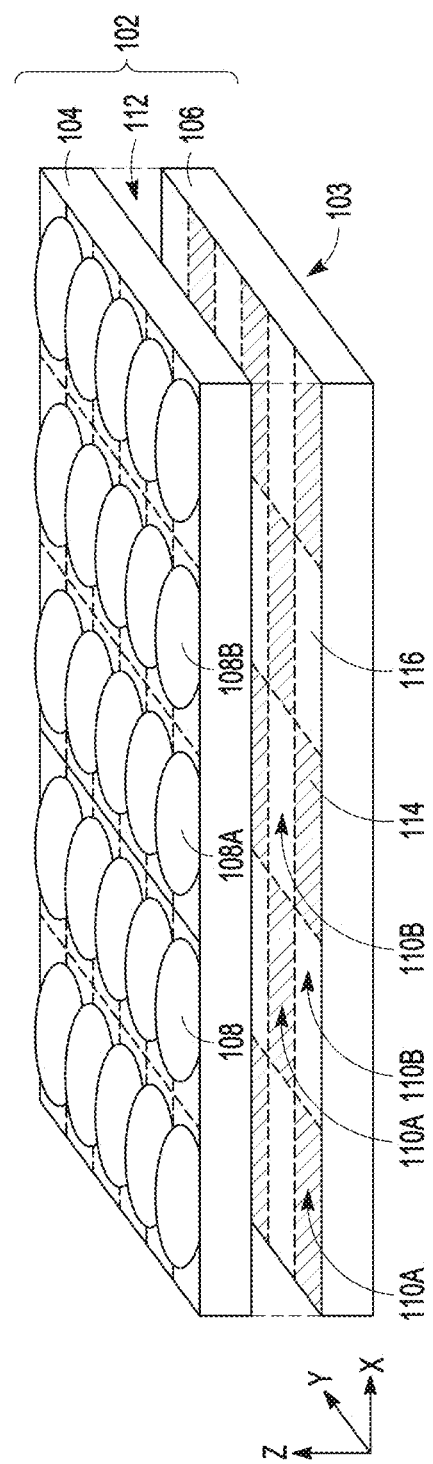
FIG. 1 is a perspective view of a first apparatus including a first optical device and first image sensor, according to some example embodiments.

The headings provided herein are merely for convenience and do not necessarily affect the scope or meaning of the terms used.

DETAILED DESCRIPTION

The apparatuses, systems, methods, techniques, instruction sequences, and computing machine program products illustrative of embodiments of the disclosure have broad applicability to various technology including displays, cameras, mobile devices, sensors, copiers, video capture, image processing, image rendering and the like.

Existing HDR technology to boost the dynamic exposure range of digital image sensors has some drawbacks. For example, HDR uses a timed sequence of exposures. Even in fractions of a second, light conditions can change. Thus, in some instances the light conditions can change between when the exposures are taken using HDR technology. Additionally, time-spacing of the images used to compose an HDR image can be problematic when the camera or the image subject moves at relative speed with respect to one another. In regards to HDR video, light conditions, relative speeds and other factors can make the HDR video difficult and/or time consuming to process.

The present disclosure proposes producing an HDR image using a combination of images taken in parallel with one another (e.g., simultaneously with one another and for a same time duration) but with sensors having one or more of differing exposures or differing sensitivity. Thus, the present disclosure proposes an image sensor including a first plurality of pixels and a second plurality of pixels. In some embodiments, a first pixel from the first plurality of pixels is disposed immediately adjacent a second pixel of the second plurality of pixels in a sensing area. In some cases, an optical device such as a lens, filter or combination thereof can be used to control an amount of exposure of the first pixel and the second pixel such that the first pixel has a first exposure and the second pixel has a second, different exposure. However, a side-by-side, immediate adjacent, or similar arrangement for the first pixel and the second pixel is not necessary in all cases and indeed in other cases two or more arrays with sensors with differing exposures or differing sensitivity can be utilized. Light to the two or more arrays can be split with an optical device such as a prism.

The present disclosure also proposes various apparatuses, systems, methods and techniques for determining the sensed luminance for the first plurality of pixels and the second plurality of pixels. The sensed luminance (luminance output) from each plurality can be used to determine a composite luminance with improved dynamic exposure range. Such determination of the composite luminance can be accomplished by various techniques such as a simple average, interpolation, or the like as is further discussed below.

According to one embodiment, the present disclosure proposes an image sensor including a first plurality of pixels and a second plurality of pixels. In some embodiments, a first pixel from the first plurality of pixels is disposed immediately adjacent a second pixel of the second plurality of pixels in a sensing area. An optical device can be used to control an amount of exposure of the first pixel and the second pixel such that the first pixel has a first exposure and the second pixel has a second exposure. The first exposure differs from the second exposure.

FIG. 1 is a perspective view of an apparatus 102 comprising a first array 103. The apparatus 102 includes an optical device 104 and image sensor 106, according to one embodiment. The optical device 104 includes a plurality of optical filters 108 configured as lens elements according to the embodiment of FIG. 1. The image sensor 106 includes a first plurality of pixels 110A and a second plurality of pixels 110B.

The optical device 104 is disposed to cover the image sensor 106 in a sensing area 112. The sensing area 112 comprises the area of the first plurality of pixels 110A and the second plurality of pixels 110B. According to the embodiment of FIG. 1, the first plurality of pixels 110A and the second plurality of pixels 110B are interspersed with one another in a non-random pattern in the sensing area 112. Only a portion of the sensing area 112 may be shown in some of the embodiments discussed in this application. The size of the sensing area 112 (i.e. the number of pixels) may be determined based on, among other factors. (a) desired resolution, (b) existence of parallax and/or occlusion, (c) desired sensitivity, and (d) desired dynamic exposure range.

As shown in the embodiment of FIG. 1, the optical device 104 can be constructed such that an individual optical filter (one of the plurality of the optical filters 108) is disposed to pass light to an individual pixel (one of the first plurality of pixels 110A or the second plurality of pixels 110B). Taking two pixels, one from each of the first plurality of pixels 110A and the second plurality of pixels 110B as an example, for a first pixel 114 of the first plurality of pixels 110A, a first optical filter 108A is configured to pass a first amount of light to only the first pixel 114. For a second pixel 116 of the second plurality of pixels 110B, a second optical filter 108B is configured to pass a second amount of light to only the second pixel 116. Worded differently, the first filter 108A and the second filter 108B have different optical transmission profiles or opacities.

The first optical filter 108A is configured to transmit relatively more of the light it receives than the second optical filter 108B. Thus, the second pixel 116 receives relatively less light than the first pixel 114. In this manner, the optical device 104 can be configured to control light transmission to the first pixel 114 and the second pixel 116 such that the first pixel 114 has a first exposure at a first level and the second pixel 116 has a second exposure at a second level which is different from the first level. This assumes the first exposure and the second exposure are taken synchronous with one another (i.e. beginning substantially simultaneously with one another and for lasting for substantially a same time duration so as to end substantially simultaneous).

As shown in FIG. 1, the first pixel 114 can be located immediately adjacent a second pixel 116 in the sensing area 112. Thus, the first pixel 114 and second pixel 116 would be subject to substantially a same amount of light if the optical device 104 (i.e. the different optical filter 108A and 108B) were not present.

According to the described embodiment, the optical device can utilize a plurality of optical filters and/or optical elements (e.g., lens, lenslet array, or the like). The present application provides examples for a black/white image sensor, however, the techniques described can be used with a color image sensor as well as red, green and blue pixel filters such as in those used in a Bayer pattern. However, according to some embodiments, the optical device can utilize one or more sensor arrays. Each of these sensor arrays comprises multiple pixel sensors arranged to capture image data responsive to light exposure. Light incident on each of the one or more sensor arrays during substantially synchronous exposure can have substantially similar color profiles (the light can be black/white, red, green or blue, for example).

In some embodiments, a group or groups of pixels may be associated with spectral color filters to receive certain wavelengths of light. Thus, example optical filters can include a traditional filter such as would be used in the Bayer pattern, an IR-cut filter, a near-IR filter, a polarizing filter. The optical devices discussed herein may have no optical filter corresponding to some of the plurality of pixels to allow reception of both the entire visible spectra and near-IR. The number of distinct optical filters may be as large as the number of pixels in some embodiments (such as the embodiment of FIG. 1). However, it is anticipated that the number of distinct optical filters can be less than the number of pixels in some embodiments such that certain of the pixels share a same one of the optical filters. For example, each of a multiplicity of red, green or blue sensor clusters in interspersed color-sensitive sensor arrays may have a single corresponding optical filter.

Figure 2:
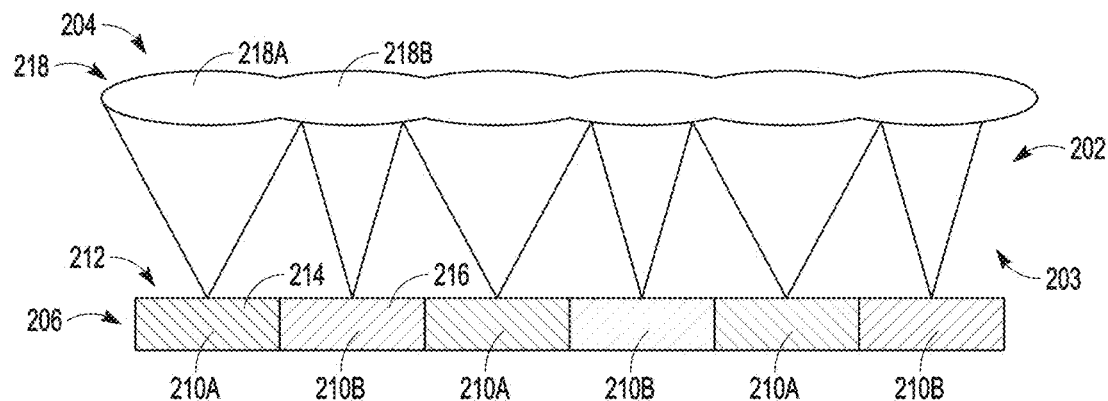
FIG. 2 is a highly schematic view of a second apparatus including a second optical device comprising a lenslet array, and a second image sensor, according to some example embodiments.

FIG. 2 shows a highly schematic view of another apparatus 202 comprising a second array 203 according to another embodiment. The apparatus 202 includes an optical device 204 and image sensor 206. The image sensor 206 can include a first plurality of pixels 210A and a second plurality of pixels 210B. The first plurality of pixels 210A includes a first pixel 214 and the second plurality of pixels 210B includes a second pixel 216. Similar to the embodiment of FIG. 1, the first pixel 214 can be located immediately adjacent the second pixel 216 in a sensing area 212. Additionally, the first plurality of pixels 210A and the second plurality of pixels 210B can be interspersed with one another in a non-random pattern in the sensing area 212.

The embodiment of FIG. 2 differs from that of FIG. 1 in that the optical device 204 comprises a lenslet array 218 that is configured transmit a relatively different amounts of light to the first pixel 214 as compared to the second pixel 216. As shown in FIG. 2, the lenslet array 218 includes a first lens 218A and a second lens 218B. The first lens 218A transmits a first amount of light to the first pixel 214 and the second lens 218B transmits a second amount of light to the second pixel 216. In one embodiment, the lenslet array 218 is configured such that a first lens 218A transmits relatively more of the light it receives to the first pixel 214 than the second lens 218B transmits to the second pixel 216. In this manner, the optical device 204 can be configured to control an amount of exposure of the first pixel 214 and the second pixel 216 such that the first pixel 214 has a first exposure at a first level and the second pixel 216 has a second exposure at a second level. Again, this assumes the first exposure and the second exposure are taken simultaneously with one another and for substantially a same time duration.

Note that the different types of lenses 218A, 218B in the example lenslet array 218 are similar in opacity, differing only in the respective areas of incident light that are directed by refraction on to the corresponding pixels 214, 216. The first lens 218A in the example embodiment of FIG. 2, for example, has a greater optical "catchment" area than the relatively smaller second lens 218B. As a result, a single image capturing exposure, results in the passage of more light on to the first pixel 214 than on to the second pixel 216. The different exposure levels thus experienced by the different pixels 214, 216 during a single exposure event is graphically represented in FIG. 2 by the different areas of the respective light cones schematically illustrating focusing of light onto the respective sensor pixels 210 by the lenslet array 218. This refractive mechanism of exposure differentiation between two interspersed sensor arrays is to be distinguished from the filter mechanism of FIG. 1. Some embodiments may provide for a combination of the different exposure differentiation mechanisms described herein.

Figure 3A:
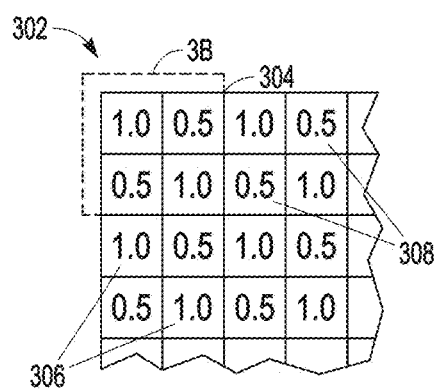
FIGS. 3A and 3B show a highly schematic representation of portions of an image sensor having different levels of exposure, according to some example embodiments.
Figure 3B:
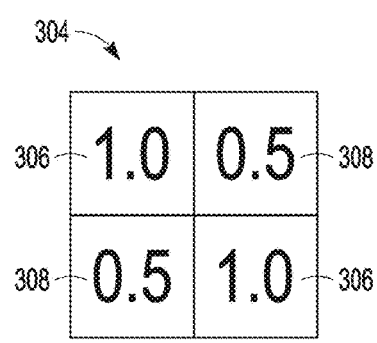

FIG. 3A shows an apparatus 302 that includes a portion of exemplary image sensor 304 having a first plurality of pixels 306 and a second plurality of pixels 308. FIG. 3B is an enlargement of a 2×2 region of the image sensor 304 showing some of the first plurality of pixels 306 and the second plurality of pixels 308. FIG. 3A shows the 2×2 region of FIG. 3B can be configured as a repeating pattern of interspersed pixels for the image sensor 304. Thus, the apparatus 302 in this example embodiment provides two pixel sensor arrays that are interspersed checkerboard fashion. Other embodiments may provide for different interspersed patterns, arrangements or arrays and/or pixels, different sensitivity of pixels (e.g., due to different well depth), different level of exposure for different pixels, and/or may use more than two interspersed arrays. Although interspersed pixels and arrays are described, it is contemplated that the pixels and arrays can be co-located according to some embodiments.

As discussed previously in reference to FIGS. 1 and 2, an optics device (not shown) can be used to control exposure of the first plurality of pixels 306 and the second plurality of pixels 308. Thus, the first plurality of pixels 306 can have a relatively higher level of exposure than the second plurality of pixels 308 in the manner previously discussed. According to other examples, no optics device may be utilized. In conjunction with or rather than having the relatively different levels of exposures between the first plurality of pixels 306 and the second plurality of pixels 308, the sensitivity of the first plurality of pixels 306 may differ than the sensitivity of the second plurality of pixels 308.

In any case, a first luminance output (e.g., an electrical output) from the first plurality of pixels 306 differs from a second luminance output of the second plurality of pixels 308. For example and with reference to FIGS. 3A and 3B, each of the first plurality of pixels 306 can have the first luminance output be 1.0 (e.g., 1 mV) while each of the second plurality of pixels 308 can have the second luminance output be 0.5 (e.g., 0.5 mV).

According to one example where different exposures are utilized, the first plurality of pixels 306 have a first exposure that comprises substantially a full exposure (indicated as 1.0 in FIGS. 3A and 3B) and the second exposure comprises substantially fifty percent exposure (indicated as 0.5 in FIGS. 3A and 3B). However, other values for the differing amounts of exposure for the first exposure and second exposure levels are contemplated.

Figure 4:
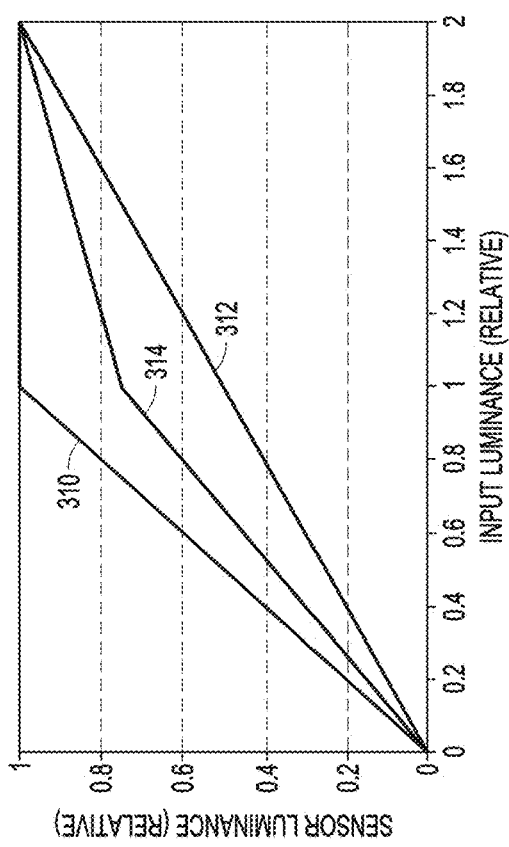
FIG. 4 shows a graph of sensor luminance as a function of input luminance for the image sensor of FIGS. 3A and 3B, according to some example embodiments.

FIG. 4 provides a plot of sensor luminance as a function of input luminance for the 2×2 array shown in FIG. 3B. In this example, the first plurality of pixels 306 with the first luminance output (1.0) are indicated by line 310. The first plurality of pixels 306 saturate once input luminance reaches 1.0 or above. The second plurality of pixels 308 with the second luminance output (0.5) are indicated by line 312. These second plurality of pixels 308 have relatively poor response for low input luminance regions (e.g., 0 to 0.6) when compared to the corresponding response of the first plurality of pixels 306. However, if one averages the sensor luminance from the first plurality of pixels 306 with the sensor luminance of the second plurality of pixels 308 as shown by line 314, the low light response of the 2×2 pixel region can be improved and saturation can be avoided once input luminance increases above the 1.0 level indicated.

Figure 5:
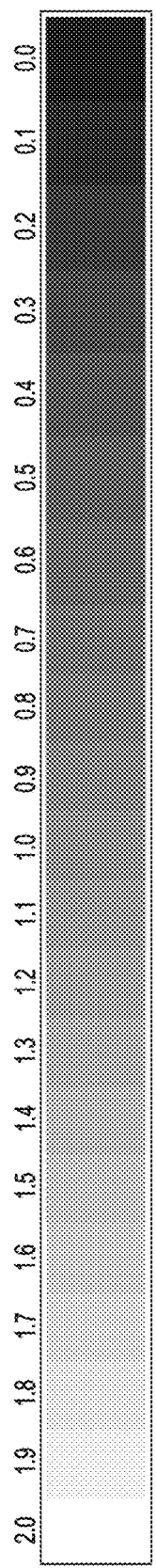
FIG. 5 provides an example of a dynamic exposure range test chart, according to some example embodiments.

FIGS. 5 and 6A to 6C provide charts in relation to the plot of FIG. 4. FIG. 5 shows a dynamic exposure range test chart corresponding to the input luminance shown in FIG. 4. Recall that examples are provided in this application in black and white. Thus, the input luminance of 2.0 corresponds to white. An input luminance of 0.0 corresponds to black. Intermediate luminance values indicate different shades of gray.

FIG. 6A shows a chart for the first plurality of pixels 306 with first luminance output (1.0) as plotted in FIG. 4 relative to input luminance. As shown in FIG. 6A, the light areas are saturated while dark areas have a relatively good dynamic exposure range. FIG. 6B shows a chart for the second plurality of pixels 308 with second luminance output (0.5). Light areas of FIG. 6B are not saturated. However, dark areas have an undesirably small dynamic exposure range. FIG. 6C shows a chart of the composite (line 314 of FIG. 4) between the luminance of the first plurality of pixels 306 and the luminance of the second plurality of pixels 308. In FIG. 6C, the light areas are not saturated and the dark areas have a relatively larger dynamic exposure range as compared to those of FIG. 6B.

Figure 7:
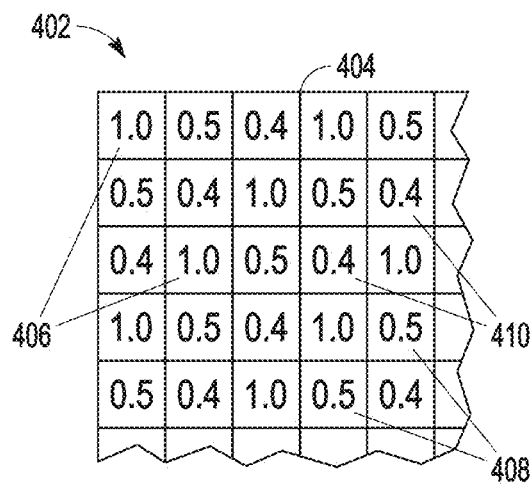
FIG. 7 shows a highly schematic representation of portions of an image sensor having three different levels of exposure, according to some example embodiments.

FIG. 7 shows a portion of exemplary apparatus 402 that includes an image sensor 404 having a first plurality of pixels 406, a second plurality of pixels 408 and a third plurality of pixels 410. FIG. 7 shows the first plurality of pixels 406, the second plurality of pixels 408 and the third plurality of pixels 410 are laid out as a repeating pattern for the image sensor 404 such that the first, second and third pluralities of pixels 406, 408 and 410 are interspersed.

As discussed previously in reference to FIGS. 1 and 2, in some embodiments an optics device (not shown) can be configured to control exposure of the first plurality of pixels 406, the second plurality of pixels 408 and the third plurality of pixels 410. Thus, the first exposure of first plurality of pixels 406 can differ from that of the second exposure of the second plurality of pixels 408 and a third exposure of the third plurality of pixels 410. According to other examples, no optics device may be utilized. In conjunction with or rather than having the relatively different levels of exposures between the first plurality of pixels 406, the second plurality of pixels 408 and the third plurality of pixels 410, the sensitivity of the first plurality of pixels 406 may differ than the sensitivity of the second plurality of pixels 408 and the sensitivity of the third plurality of pixels 410.

In any case, a first luminance output (e.g., an electrical output) from the first plurality of pixels 406 differs from a second luminance output of the second plurality of pixels 408 and a third luminance output of the third plurality of pixels 410. For example and with reference to FIG. 7, each of the first plurality of pixels 406 can have the first luminance output be 1.0 (e.g., 1 mV) while each of the second plurality of pixels 408 can have the second luminance output be 0.5 (e.g., 0.5 mV) and each of the third plurality of pixels 410 can have a third luminance output be 0.4 (e.g., 0.4 mV). The first luminance output can differ from the second luminance output and can result from any one or any combination of: a different exposure of the first plurality of pixels 406 than the second plurality of pixels 408, a different sensitivity of the first plurality of pixels 406 than the second plurality of pixels 408, and/or a different response behavior of the first plurality of pixels 406 than the second plurality of pixels 408.

According to one example where different exposures are utilized, the first exposure comprises substantially a full exposure (indicated as 1.0 in FIG. 7), the second exposure comprises substantially fifty percent exposure (indicated as 0.5 in FIG. 7) and the third exposure comprises substantially forty percent (indicated 0.4 in FIG. 7). However, other amounts of exposure, sensitivity and/or response behavior are contemplated. Furthermore, further pluralities of pixels with further levels of exposure, sensitivity, and/or response behavior are contemplated with the techniques disclosed herein. The luminance outputs from each the pluralities of pixels (e.g., the first plurality of pixels 406, the second plurality of pixels 408 and the third plurality of pixels 410) can comprise a composite in the manner discussed in reference to FIGS. 3A-6C. The composite can be the result of simple average and/or processing techniques such as interpolation (e.g., bicubic spline, cubic, nearest-neighbor, bilinear, etc.) can be used to increase the dynamic exposure range.

Figure 8:
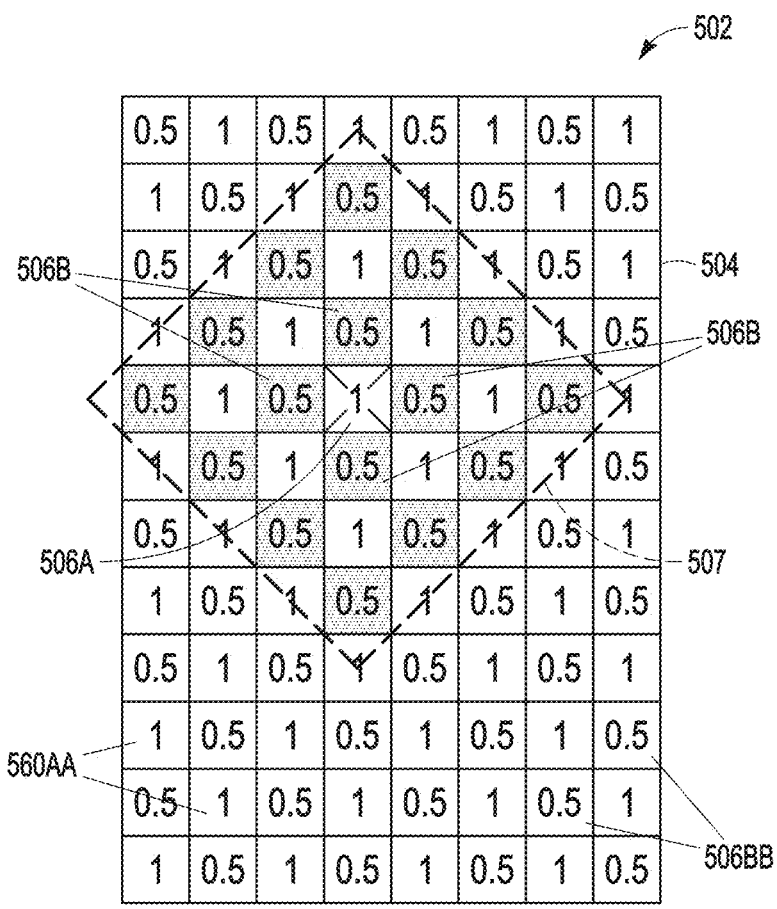
FIG. 8 shows a highly schematic representation of portions of an image sensor with interpolation being performed thereon to improve the dynamic exposure range, according to some example embodiments.

FIG. 8 provides an embodiment of an apparatus 502 including an image sensor 504 where bicubic spline interpolation has been performed on the luminance of sixteen pixels to increase the dynamic exposure range. The results of such interpolation allow for a smoother luminance output with fewer artifacts than would be achieved with the simple averaging techniques discussed in reference to FIGS. 3A-6C.

In the exemplary embodiment of FIG. 8, the image sensor 504 has a configuration similar to that of FIGS. 3A and 3B. Thus, each of a first plurality of pixels 506AA can have the first luminance output be 1.0 (e.g., 1 mV) while each of a second plurality of pixels 506BB can have a second luminance output be 0.5 (e.g., 0.5 mV). In some embodiments so that the first plurality of pixels 506AA and the second plurality of pixels 506BB can be interspersed with one another as previously described in reference FIGS. 3A and 3B. As shown in FIG. 8, sixteen of the 506BB can be selected to comprise a group 507. These sixteen pixels of the group 507 are identified with different shading in FIG. 8.

As shown in FIG. 8, assuming pixel 506A (indicated with X) has become saturated, a bicubic interpolation is used to solve for the value of the pixel 506A based on the sixteen pixels identified in the group 507 surrounding the pixel 506A.

To perform such interpolation, one must solve for a function that is continuous and has continuous first derivatives at the four nearest neighbor pixels 506B to the pixel 506A. The continuity condition gives sixteen equations (four for the values of the four nearest neighbors, four for the slope in the x direction, four for the slope in the y direction, and four for the cross-derivatives). Solving this equation gives the value of the interpolated pixel 506A.

This course of calculation can be repeated for all saturated pixels in the image sensor 504. In the above example, interpolation was performed to determine the value of a saturated pixel (i.e. pixel 506A) due to high light conditions. However, one can also interpolate to determine the values of pixels in low light as well. In low light, the pixels having lower sensitivity (e.g., pixels 506BB) may have noticeably higher noise. In the low light case, the low sensitivity pixels can be interpolated based on the values of the high sensitivity pixels (e.g., pixels 506AA).

Figure 9:
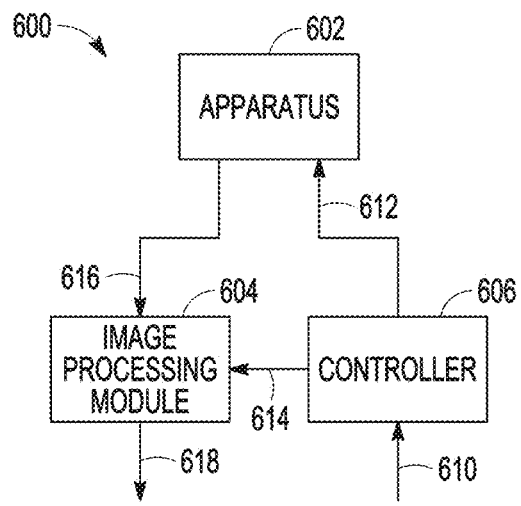
FIG. 9 shows a block diagram of an exemplary system used to improve the dynamic exposure range for an image sensor such as those previously illustrated, according to some example embodiments.

FIG. 9 is a diagram illustrating an imaging system 600, according to an exemplary embodiment. The imaging system 600 includes, among other components, an apparatus 602 (i.e. one or more of the apparatuses 102, 202, 302, 402 or 502 as previously discussed), an image processing module 604 and a controller 606.

The system 600 can include a non-transitory processor-readable storage medium storing processor executable instructions that, when executed by the controller 606 and/or the image processing module 604, cause the controller 606 and/or image processing module 604 to perform various tasks and functions to increase the dynamic exposure range by determining luminance sensed by pixels and determining a composite luminance (e.g., by simple average, interpolation, or the like).

For example, the non-transitory processor-readable storage medium storing processor executable instructions can cause the controller 606 to control the apparatus 602 and/or the image processing module 604. Thus, the controller 606 can include hardware, software, firmware or a combination thereof for controlling various operation parameters of the apparatus 602, as well as functions of the image processing module 604. The controller 606 can receive input 610 from a user or other external components and can send operation signals 612 to control the apparatus 602. The controller 606 can also send information 614 to the image processing module 604 to assist processing of the images 616 captured by the apparatus 602. Similarly, the image processing module 604 can include hardware, firmware, software or a combination for processing the images 616 received from the apparatus 602. The processed image 618 is then sent for display, storage, transmittal or further processing as is further described in the embodiments of FIGS. 11-13.

Figure 10:
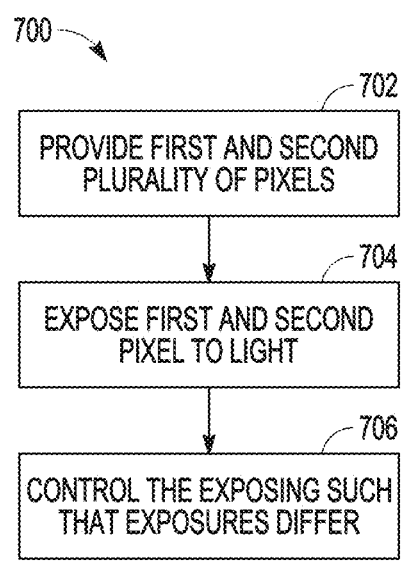
FIG. 10 is a flow chart illustrating a process for improving the dynamic exposure range of an image sensor such as those previously illustrated, according to some example embodiments.

FIG. 10 shows a flow diagram of a method 700 according to one embodiment. The method 700 includes providing 702 a first plurality of pixels and a second plurality of pixels. As previously discussed, the first plurality of pixels includes at least a first pixel and the second plurality of includes at least second pixel. The method 700 includes exposing 704 the first pixel and the second pixel to light synchronously (i.e. substantially simultaneously and for a substantially a same time duration). The method 700 controls 706 the exposing such that the first pixel has a first exposure and the second pixel has a second exposure and the first exposure differs from the second exposure.

According to some embodiments, the method 700 includes determining both a first luminance from the first exposure and a second luminance from the second exposure. If a third plurality of pixels including at least a third pixel is used in combination with the first plurality of pixels and the second plurality of pixels, the method 700 can include exposing the third pixel to light synchronously (i.e. substantially simultaneous with and for a same duration as the first pixel and the second pixel). Additionally, the method can control the exposing to the third pixel such that the third pixel has third exposure. Thus, the first exposure, the second exposure and the third exposure can all differ from one another. The method can also determine a composite luminance from the first luminance and the second luminance (additionally from the third luminance, etc. if further pluralities of pixels are utilized) according to some embodiments. In other embodiments, the method determines luminance for the apparatus by averaging or by interpolating between one or more luminance of various of the plurality of pixels as previously discussed.

Figure 14:
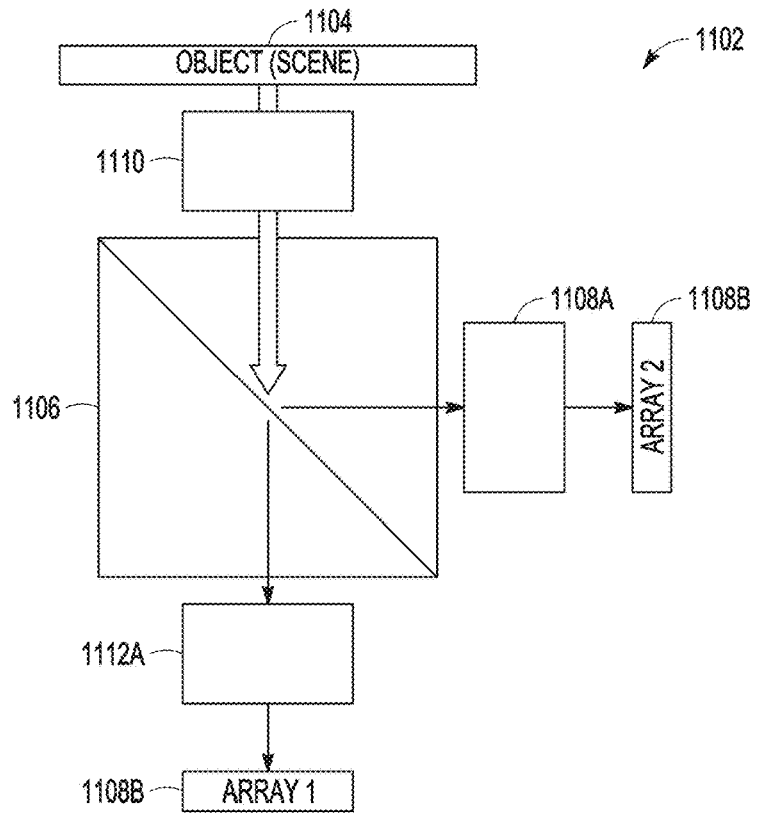
FIG. 14 shows a device having two or more arrays, each array having a different luminance output according to an example embodiment.

FIG. 14 shows a device 1102 used to capture a scene 1104. Rather than relying on an image sensor with interspersed pixels on a single array having a different luminance output as described in previous embodiments, the device 1102 relies on a beam splitting device 1106 such as a cube, plate, or prism to split light and direct the light to two or more image sensor arrays 1108A and 1108B. Each of the two or more image sensor arrays 1108A and 1108B can have a different luminance output according to the example of FIG. 14. Thus, image sensor array 1108A can have a different sensitivity and/or different exposure than image sensor array 1108B. In this manner, the device 1102 does not rely on interspersed pixels within a single array each pixel or groups of pixels having different luminance output to increase the dynamic exposure range.

FIG. 14 also shows that in certain embodiments, the device 1102 can include a first optical device 1110 (e.g., a shutter, filter, lens, combinations thereof, etc.) arranged to pass light to the beam splitting device 1106. Similarly, two or more optical devices 1112A and 1112B (e.g., shutters, filters, lenses, combinations thereof, etc.) can be arranged to pass light from the beam splitting device 1106 to the two or more image sensor arrays 1108A and 1108B. However, in other embodiments, the device 1102 need not include the first optical device 1110 and/or the two or more optical devices 1112A and 1112B.

In FIG. 14, light from the scene 1104 is divided by the beam-splitting device 1106 and imaged to the two or more image sensor arrays 1108A and 1108B. The two or more image sensor arrays 1108A and 1108B may have the same or different sensitivity to light according to some embodiments. The beam-splitting device 1106 may direct the same or different amount of luminance to each of the two or more image sensor arrays 1108A and 1108B. However, each of the two or more image sensor arrays 1108A and 1108B can receive nominally the same spatial image.

Thus, according to the example of FIG. 14 the device 1102 can be comprised of a plurality of sensor arrays (e.g., image sensor arrays 1108A and 1108B). Each of the sensor arrays comprises multiple pixel sensors arranged to capture image data responsive to light exposure. Light incident on the respective sensor arrays during substantially synchronous exposure can have a substantially similar color profile in some cases. In other cases, light incident on the respective sensor arrays during substantially synchronous exposure can have different color profile for each array. According to the example of FIG. 14, the plurality of sensor arrays are configured such that the image data captured by the respective sensor arrays during the synchronous exposure differ in a luminance output from one another.

Figure 15:
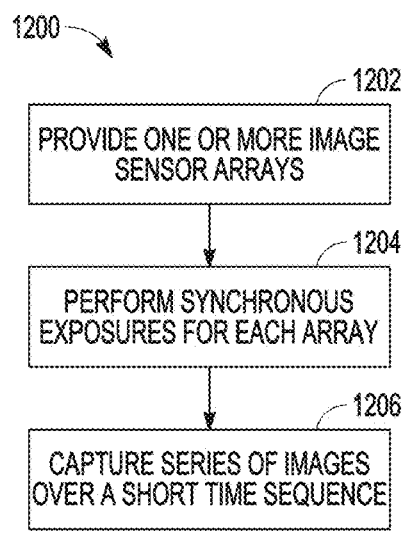
FIG. 15 is a method for increasing the dynamic exposure range for a video or short burst capture using one or more of the techniques, systems and apparatuses described in the present application.

FIG. 15 shows a method 1200 according to another embodiment whereby the dynamic exposure range is increased for a video or short burst capture using one or more of the techniques, systems and apparatuses described herein. The method 1200 includes providing 1202 one or more sensor arrays such as those previously described. The method 1200 performs 1204 synchronous exposures on each of the one or more sensor arrays. The method 1200 captures 1206 a series of images (e.g., has a series of luminance outputs) over a short time sequence. The images can be a series of composite images having an improved high dynamic exposure range based on the image data captured by the plurality of sensor arrays using the processing techniques discussed previously. For the purposes of this application, the short time sequence means a time interval less than $\frac{1}{15}$th of a second. According to further embodiments, the short time sequence means a time interval less than $\frac{1}{24}$th of a second.

Thus, the method 1200 contemplates use of a device with a plurality of sensor arrays, each of which comprises multiple pixel sensors arranged to capture image data responsive to light exposure. Light is incident on the respective sensor arrays during substantially synchronous exposures. The plurality of sensor arrays are configured such that the image data captured by the respective sensor arrays during the synchronous exposure differ in at least one of a luminance output or a color profile from one another.

The above description and the description that follows includes apparatuses, systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known terminology, instruction instances, protocols, structures, and techniques are not necessarily shown or discussed in detail.

Modules, Components, and Logic

Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 11:
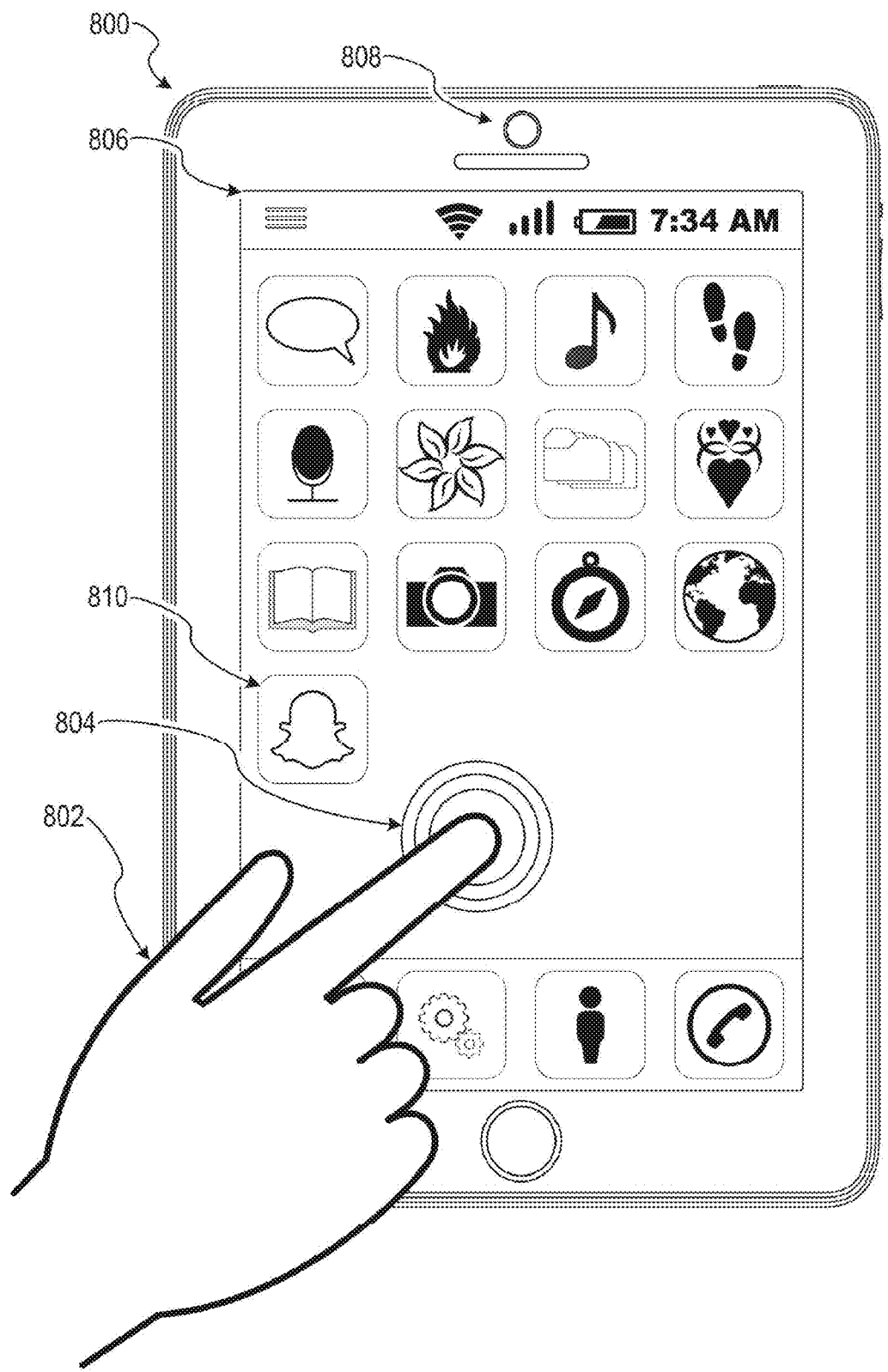
FIG. 11 is a user interface diagram depicting an example mobile device and mobile operating system interface, according to some example embodiments.

FIG. 11 illustrates an example mobile device 1000 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 11, includes an imaging device 808 that can include the apparatuses 102, 202, 302, 402, 502 and 602 as previously described. The imaging device may be a camera or any other device coupled to the mobile device 800 capable of capturing images, one or more successive images, or a video stream. The imaging device 808 may be part of a larger system such as system 600 previously described (conversely system 600 can be part of mobile device 800). A selectable user interface element or other implement can be used to initiate capture of image(s) or a video stream. This image(s) or video stream can be passed to systems for processing according to the one or more techniques described in the present disclosure. Although the apparatuses 102, 202, 302, 402, 502, 602, 1102 and system 600 are described specifically in reference to the imaging device 808, in other embodiments the apparatuses, systems, methods and techniques described herein could be used with other aspects of the mobile device 800 so as to improve the quality of the dynamic exposure range of the home screen 806, for example.

Many varieties of applications (also referred to as "apps") can be executing on the mobile device 800, such as native applications (e.g., applications programmed in Objective-C. Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion.

Software Architecture

Figure 12:
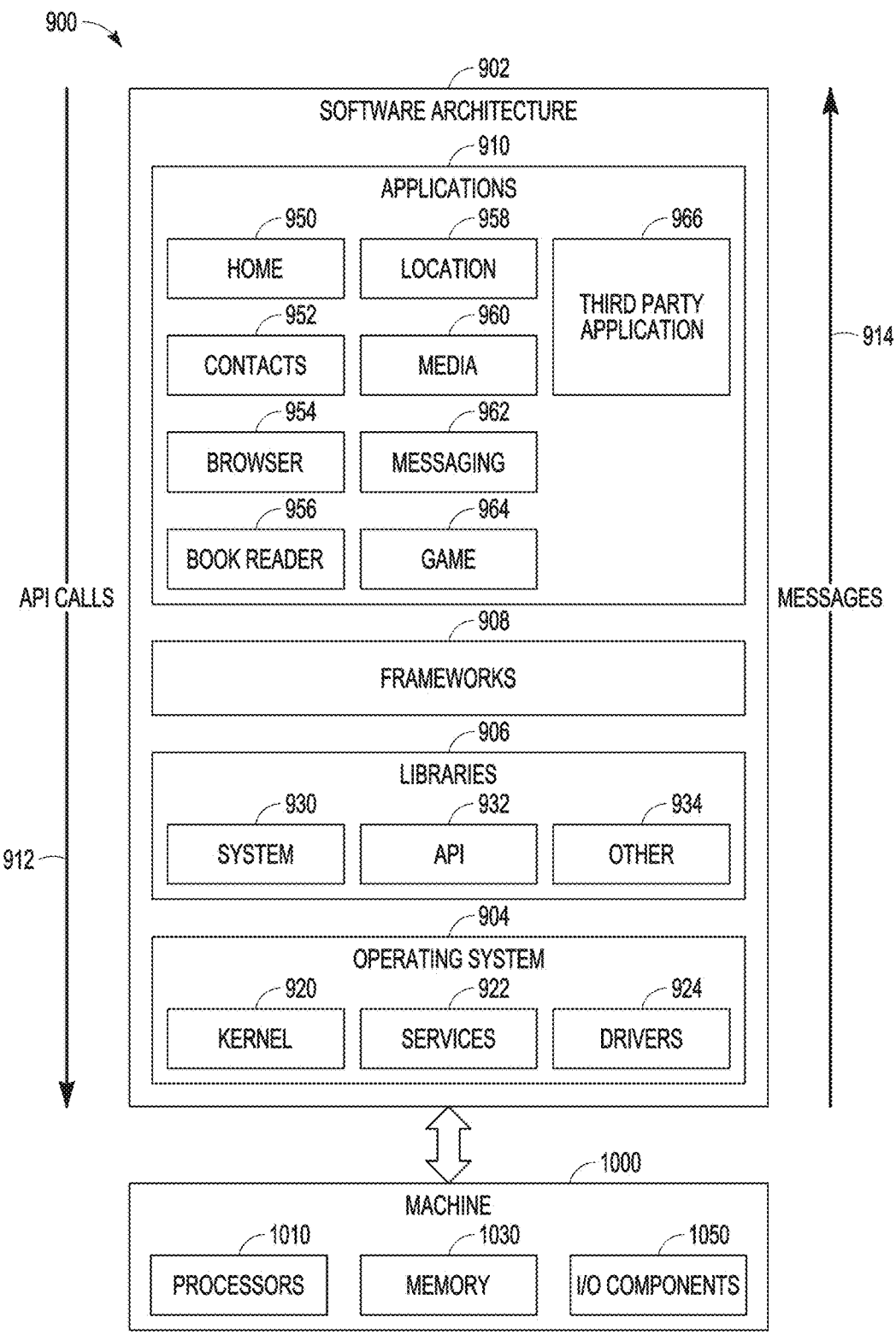
FIG. 12 is a block diagram illustrating an example of a software architecture that may be installed on a machine, according to some example embodiments.

FIG. 12 is a block diagram 900 illustrating an architecture of software 902, which can be installed on the devices described above. FIG. 12 is merely a non-limiting example of a software architecture, and it will be appreciated that many other architectures can be implemented to facilitate the functionality described herein. In various embodiments, the software 902 is implemented by hardware such as machine a 1000 of FIG. 13 that includes processors 1010, memory 1030, and I/O components 1050. In this example architecture, the software 1102 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create the applications 910, structured in a variety of manners, such as object-oriented programming languages (e.g., Objective-C. Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 966 can invoke the API calls 912 provided by the operating system 904 to facilitate functionality described herein.

Example Machine Architecture and Machine-Readable Medium

Figure 13:
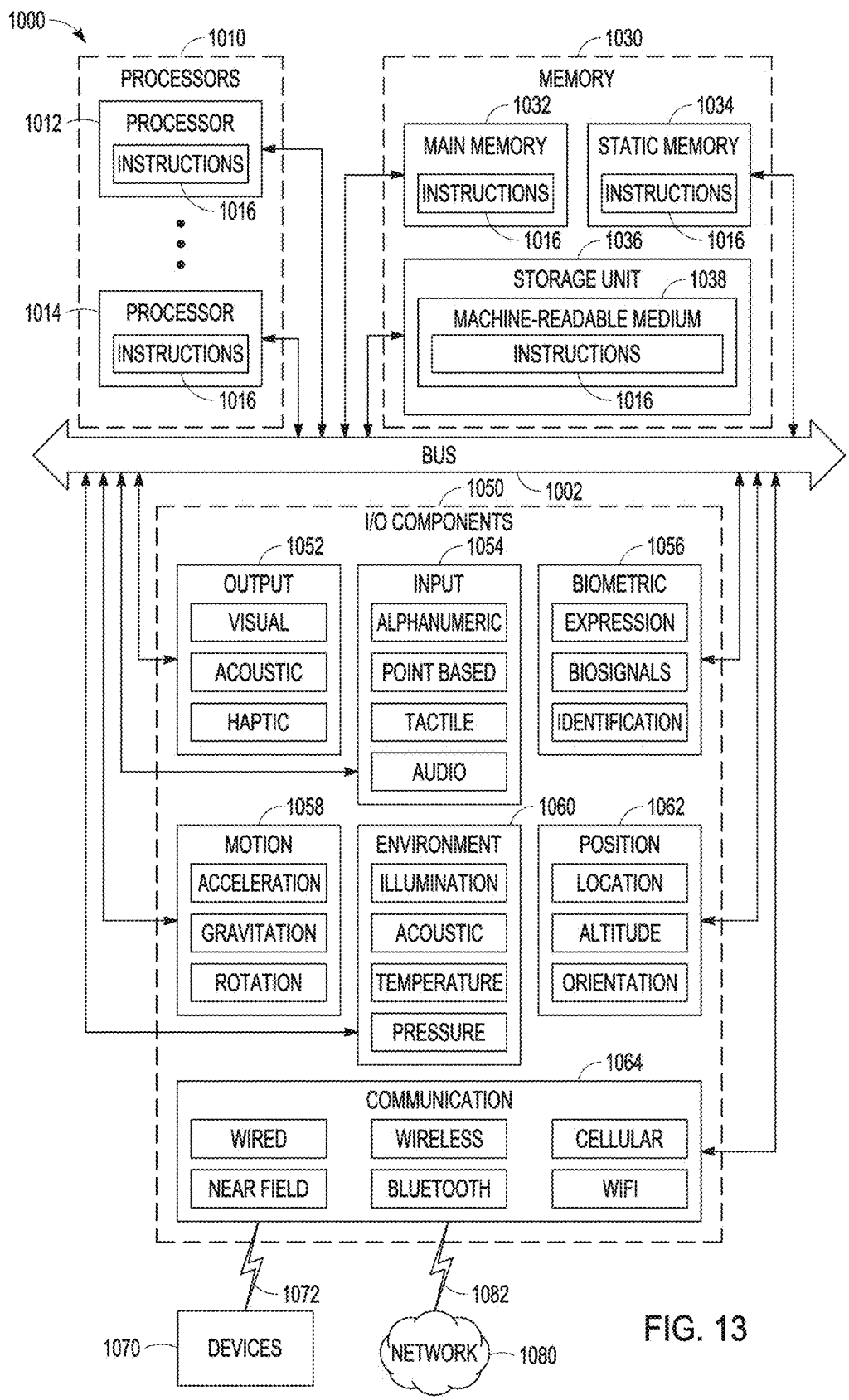
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of the machine 1000, according to some embodiments, able to read instructions (e.g., processor executable instructions) from a machine-readable medium (e.g., a non-transitory processor-readable storage medium) and perform any of the methodologies discussed herein. Specifically, FIG. 13 shows a diagrammatic representation of the machine 1000 in the example form of a computer system, within which instructions 1016 (e.g., software, a program, an application, an applet, an app, or other executable code) for causing the machine 1000 to work in concert with the apparatuses 102, 202, 302, 402, 502, 602 and 1102 previously described to execute any of the methodologies discussed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 13 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 13. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components. Near Field Communication (NFC) components. BLUETOOTH® components (e.g., BLUETOOTH® Low Energy). WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph. MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

EXAMPLES

Example 1 is an apparatus that can comprise: a plurality of sensor arrays, each of which comprises multiple pixel sensors arranged to capture image data responsive to light exposure. Light incident on the respective sensor arrays during substantially synchronous exposures can have a substantially similar color profile. The plurality of sensor arrays can be configured such that the image data captured by the respective sensor arrays during the synchronous exposure differ in a luminance output from one another.

In Example 2, the subject matter of Example 1, optionally includes the plurality of sensor arrays are separated from one another.

In Example 3, the subject matter of any one or any combination of Examples 1-2, further optionally includes an exposure mechanism configured to provide the substantially synchronous exposure of the plurality of sensor arrays, wherein the exposure mechanism can comprise an optical device configured to admit different amounts of light to the different sensor arrays during the synchronous exposure.

In Example 4, the subject matter of claim 3, optionally includes the optical device is configured to filter light admitted to the plurality of sensor arrays during exposure by different respective degrees for different sensor arrays.

In Example 5, the subject matter of claim 3, optionally includes the optical device comprises a lenslet array configured to direct by means of refraction different amounts of light during exposure of the different sensor arrays.

In Example 6, the subject matter of any one or any combination of Examples 1-5, further optionally includes an image processor configured to generate a composite image based on the image data captured by the plurality of sensor arrays.

In Example 7, a system that can comprise: an image sensor and an optical device. The image sensor can include a first plurality of pixels and a second plurality of pixels. The first pixel from the first plurality of pixels can be disposed immediately adjacent a second pixel of the second plurality of pixels in a sensing area. The optical device can be configured to control an amount of exposure of the first pixel and the second pixel such that the first pixel has a first exposure and the second pixel has a second exposure. The first exposure and the second exposure can be taken simultaneously synchronously, and the first exposure differs from the second exposure.

In Example 8, the subject matter of Example 7, optionally includes the first exposure comprises substantially a full exposure and the second exposure comprises substantially fifty percent exposure.

In Example 9, the subject matter of any one or any combination of Examples 7-8, further optionally includes: a non-transitory processor-readable storage medium storing processor executable instructions that, when executed by one or more processors, cause the one or more processors to perform operations comprising: determine both a first luminance from the first exposure and a second luminance from the second exposure; and determine a composite luminance from the first luminance and the second luminance.

In Example 10, the subject matter of Example 9, optionally includes the composite luminance is determined by one or more of averaging the first luminance and the second luminance and interpolating between the first luminance and the second luminance.

In Example 11, the subject matter of any one or any combination of Examples 7-10, optionally can include the optical device includes an optical filter that is configured transmit a relatively different amount of light to the first pixel as compared to the second pixel.

In Example 12, the subject matter of any one or any combination of Examples 7-10, optionally can include the optical device comprises a lenslet array that is configured transmit a relatively different amounts of light to the first pixel as compared to the second pixel.

In Example 13, the subject matter of any one or any combination of Examples 7-12, optionally can include the first pixel is disposed immediately adjacent the second pixel in the sensing area so that the first pixel and second pixel would be subject to substantially a same amount of light if the optical device were not present.

In Example 14, the subject matter of any one or any combination of Examples 7-13, optionally can include the image sensor includes a third plurality of pixels that include a third pixel and the optical device is configured to control an amount of exposure of the third pixel such that the third pixel has third exposure taken simultaneously with one another and for substantially the same time duration as the first exposure and the second exposure, and wherein the first exposure, the second exposure, and the third exposure all differ from one another.

In Example 15, the subject matter of any one or any combination of Examples 7-14, optionally can include the first plurality of pixels includes the first pixel and at least a third pixel, the first pixel and the third pixel both subject to the first exposure and further comprising: a non-transitory processor-readable storage medium storing processor executable instructions that, when executed by the one or more processors, cause the one or more processors to perform operations including interpolating between first pixel and the third pixel at the first exposure of determine a luminance of the first pixel and the third pixel.

In Example 16, the subject matter of any one or any combination of Examples 7-15, optionally can include the first plurality of pixels and the second plurality of pixels are interspersed with one another in a non-random pattern in the sensing area.

In Example 17, a method that can include: providing an image sensor with a first plurality of pixels and a second plurality of pixels, wherein the first plurality of pixels includes a first pixel and the second plurality of includes a second pixel; exposing the first pixel and the second pixel to light substantially synchronously; and controlling the exposing such that the first pixel has a first exposure and the second pixel has a second exposure and the first exposure differs from the second exposure.

In Example 18, the subject matter of Example 17, can further include: determining both a first luminance from the first exposure and a second luminance from the second exposure; and determining a composite luminance from the first luminance and the second luminance.

In Example 19, the subject matter of any one or any combination of Examples 17-18, can optionally include determining the composite luminance includes one or more of averaging the first luminance and the second luminance and interpolating between the first luminance and the second luminance.

In Example 20, the subject matter of any one or any combination of Examples 17-19, further can optionally include disposing the first pixel immediately adjacent the second pixel in a sensing area so that the first pixel and second pixel would be subject to substantially a same amount of light if an optical device were not present.

In Example 21, the subject matter of Example 20, can further optionally include: providing a third plurality of pixels that include a third pixel; exposing the third pixel to light simultaneously with and for a same time duration as the first pixel and the second pixel; and controlling exposing to the third pixel such that the third pixel has third exposure, and wherein the first exposure, the second exposure, and the third exposure all differ from one another In Example 22, an apparatus that can include: an image sensor including a first plurality of pixels and a second plurality of pixels, wherein a first pixel from the first plurality of pixels is disposed immediately adjacent a second pixel of the second plurality of pixels in a sensing area; an optical device configured to control an amount of exposure of the first pixel and the second pixel such that the first pixel has a first exposure and the second pixel has a second exposure, wherein the first exposure and the second exposure are taken substantially synchronously, and wherein the first exposure differs from the second exposure.

In Example 23, the subject matter of Example 22, can further optionally include: a non-transitory processor-readable storage medium storing processor executable instructions that, when executed by one or more processors, cause the one or more processors to perform operations comprising: determine both a first luminance from the first exposure and a second luminance from the second exposure; and determine a composite luminance from the first luminance and the second luminance.

In Example 24, the subject matter of Example 23, optionally can include the composite luminance is determined by one or more of averaging the first luminance and the second luminance and interpolating between the first luminance and the second luminance.

In Example 25, the subject matter of any one or any combination of Examples 22-24, optionally can include the optical device comprises a lenslet array that is configured transmit a relatively different amounts of light to the first pixel as compared to the second pixel.

In Example 26, the subject matter of any one or any combination of Examples 22-25, optionally can include the image sensor includes a third plurality of pixels that include a third pixel and the optical device is configured to control an amount of exposure of the third pixel such that the third pixel has third exposure taken simultaneously with one another and for substantially the same time duration as the first exposure and the second exposure, and wherein the first exposure, the second exposure, and the third exposure all differ from one another.

In Example 27, an apparatus that can comprise: a plurality of sensor arrays, each of which comprises multiple pixel sensors arranged to capture image data responsive to light exposure, light incident on the respective sensor arrays during substantially synchronous exposures; the plurality of sensor arrays can be configured such that the image data captured by the respective sensor arrays during the synchronous exposure differ in at least one of a luminance output or a color profile from one another.

In Example 28, the apparatuses, method and/or system of any one or any combination of the previous claims wherein plurality of sensor arrays or the image sensor capture a series of images over a short time sequence.

In Example 29, the systems, apparatuses and methods of any one or any combination of Examples 1-28 can optionally be configured such that all elements or options recited are available to use or select from.

What is claimed is:

1. A system comprising:
   an image sensor including a first plurality of pixels and a second plurality of pixels, wherein a first pixel from the first plurality of pixels is disposed immediately adjacent a second pixel of the second plurality of pixels in a sensing area;
   an optical device configured to control an amount of exposure of the first pixel and the second pixel such that the first pixel has a first exposure and the second pixel has a second exposure, wherein the first exposure and the second exposure are taken simultaneously synchronously, and wherein the first exposure differs from the second exposure; and
   a non-transitory processor-readable storage medium storing processor executable instructions that, when executed by one or more processors, cause the one or more processors to perform operations comprising:
   determine both a first luminance from the first exposure and a second luminance from the second exposure; and
   determine a composite luminance from the first luminance and the second luminance wherein the composite luminance is determined by interpolating between the first luminance and the second luminance and according to a light condition, and wherein the interpolating comprises a bicubic interpolation where the value of the first pixel is based on sixteen pixels surrounding the first pixel.

2. The system of claim 1, wherein first exposure comprises substantially a full exposure and the second exposure comprises substantially fifty percent exposure.

3. The system of claim 1, wherein the optical device includes an optical filter that is configured transmit a relatively different amount of light to the first pixel as compared to the second pixel.

4. The system of claim 1, wherein the optical device comprises a lenslet array that is configured transmit a relatively different amounts of light to the first pixel as compared to the second pixel.

5. The system of claim 1, wherein the first pixel is disposed immediately adjacent the second pixel in the sensing area so that the first pixel and second pixel would be subject to substantially a same amount of light if the optical device were not present.

6. The system of claim 1, wherein the image sensor includes a third plurality of pixels that include a third pixel and the optical device is configured to control an amount of exposure of the third pixel such that the third pixel has third exposure taken simultaneously with one another and for substantially the same time duration as the first exposure and the second exposure, and wherein the first exposure, the second exposure, and the third exposure all differ from one another.

7. The system of claim 1, wherein the first plurality of pixels includes the first pixel and at least a third pixel, the first pixel and the third pixel both subject to the first exposure and further comprising:
   a non-transitory processor-readable storage medium storing processor executable instructions that, when executed by the one or more processors, cause the one or more processors to perform operations including interpolating between first pixel and the third pixel at the first exposure of determine a luminance of the first pixel and the third pixel.

8. The system of claim 1, wherein the first plurality of pixels and the second plurality of pixels are interspersed with one another in a non-random pattern in the sensing area.

9. A method comprising:
   providing an image sensor with a first plurality of pixels and a second plurality of pixels, wherein the first plurality of pixels includes a first pixel and the second plurality of includes a second pixel;
   exposing the first pixel and the second pixel to light substantially synchronously; and
   controlling the exposing such that the first pixel has a first exposure and the second pixel has a second exposure and the first exposure differs from the second exposure;
   determining both a first luminance from the first exposure and a second luminance from the second exposure; and
   determining a composite luminance from the first luminance and the second luminance, wherein determining the composite luminance includes interpolating between the first luminance and the second luminance and according to a light condition, and wherein the interpolating comprises a bicubic interpolation where the value of the first pixel is based on sixteen pixels surrounding the first pixel.

10. The method of claim 9, further comprising capturing a series of images over a short time sequence.

* * * * *